US012671994B2

(12) United States Patent
Zheng

(10) Patent No.: US 12,671,994 B2
(45) Date of Patent: Jun. 30, 2026

(54) INTEGRITY PROTECTION FAILURE HANDLING METHOD AND APPARATUS, AND USER EQUIPMENT

(71) Applicant: VIVO MOBILE COMMUNICATION CO., LTD., Guangdong (CN)

(72) Inventor: Qian Zheng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 283 days.

(21) Appl. No.: 17/983,548

(22) Filed: Nov. 9, 2022

(65) Prior Publication Data

US 2023/0070757 A1     Mar. 9, 2023

Related U.S. Application Data

(63) Continuation of application No. PCT/CN2021/093828, filed on May 14, 2021.

(30) Foreign Application Priority Data

May 15, 2020     (CN) .......................... 202010415321.3

(51) Int. Cl.
| | |
|---|---|
| *G06F 21/00* | (2013.01) |
| *H04W 12/106* | (2021.01) |
| *H04W 76/30* | (2018.01) |

(52) U.S. Cl.
CPC ......... *H04W 12/106* (2021.01); *H04W 76/30* (2018.02)

(58) Field of Classification Search
CPC ... H04W 12/106; H04W 76/30; H04W 76/18; H04W 76/19; H04W 76/23; H04W 76/14; H04W 92/18; H04W 12/102; H04W 12/10; H04W 24/08
See application file for complete search history.

(56) References Cited

U.S. PATENT DOCUMENTS

| | | | | |
|---|---|---|---|---|
| 2009/0320100 A1* | 12/2009 | Kitazoe | ................. | H04L 1/1607 |
| | | | | 709/227 |
| 2017/0048011 A1 | 2/2017 | Lee et al. | | |
| 2019/0045568 A1 | 2/2019 | Palat et al. | | |
| 2019/0297502 A1 | 9/2019 | Jo et al. | | |
| 2019/0335523 A1 | 10/2019 | Wu | | |
| 2019/0335532 A1 | 10/2019 | Kim et al. | | |

(Continued)

FOREIGN PATENT DOCUMENTS

| | | | | | |
|---|---|---|---|---|---|
| CN | 108810899 A | * | 11/2018 | ............. | H04L 41/06 |
| CN | 109151826 A | | 1/2019 | | |

(Continued)

OTHER PUBLICATIONS

3rd Generation Partnership Project, "Technical Specification Gorup Radio Access Network", Radio Resource Control (RRC) protocol specification (Release 16), 3GPP TS 38.331 V16.0.0, Mar. 2020.

(Continued)

*Primary Examiner* — Michael M Lee
(74) *Attorney, Agent, or Firm* — Price Heneveld LLP

(57) ABSTRACT
An integrity protection failure handling method and apparatus, and user equipment are provided. The method includes: performing, by a first user equipment, a security control operation in at least a case that an integrity check failure indication for a sidelink signaling bearer is received.

16 Claims, 3 Drawing Sheets

Start

Perform a security control operation in at least a case that an integrity check failure indication for a sidelink signaling bearer is received ⟋ 101

End

(56) References Cited

U.S. PATENT DOCUMENTS

| | | | |
|---|---|---|---|
| 2019/0363843 A1 | 11/2019 | Gordaychik | |
| 2020/0092726 A1 | 3/2020 | Yang | |
| 2020/0120491 A1 | 4/2020 | Mildh et al. | |
| 2020/0137638 A1 | 4/2020 | Kim | |
| 2020/0169887 A1* | 5/2020 | Wager | H04W 12/106 |
| 2020/0205003 A1* | 6/2020 | Ingale | H04W 12/04 |
| 2020/0229047 A1 | 7/2020 | Kimba Dit Adamou et al. | |
| 2021/0168889 A1 | 6/2021 | Kimba Dit Adamou et al. | |
| 2021/0297861 A1* | 9/2021 | Nakarmi | H04W 12/03 |
| 2021/0329510 A1* | 10/2021 | Tseng | H04W 76/23 |
| 2022/0014921 A1* | 1/2022 | Da Silva | H04L 9/3242 |
| 2023/0180329 A1* | 6/2023 | Wu | H04W 76/19 370/216 |

FOREIGN PATENT DOCUMENTS

| | | | | |
|---|---|---|---|---|
| CN | 110651491 A | 1/2020 | | |
| CN | 110831254 A | 2/2020 | | |
| WO | WO-2018228321 A1 * | 12/2018 | | H04W 12/10 |
| WO | 2020084191 A1 | 4/2020 | | |
| WO | WO-2021219068 A1 * | 11/2021 | | H04W 36/24 |

OTHER PUBLICATIONS

Ericsson (Rapporteur), "Sumary of email discussion [107#75][NR/V2X] RLF", R2-1913328, 3GPP TSG-RAN WG2 #107bis, Oct. 14-18, 2019, Chongqing, China.

LG Electronics, "Remaining issue on PC5 RLM/RLF", R2-1913884, 3GPP TSG-RAN WG2 Meeting #107bis, Oct. 14-18, 2019, Chongqing, China.

Huawei, Hilsilicon, "Summary of offline discussion [701][V2X] V2X RRC ASN. 1 issues", R2-2005965, 3GPP TSG-RAN WG2 Meeting #110 electronic, Jun. 1-12, 2020.

Ericsson, "[108#28][R16 RRC] 38331 Rel-16 CR Merge", R2-2001086, 3GPP TSG-RAN WG2 Meeting #109e, Feb. 24-Mar. 6, 2020, Elbonia.

Vivo, "UE behavior upon detecting sidelink SRB integrity check failure (RIL#V024)", R2-2005295, 3GPP TSG-RAN WG2 Meeting #110 electronic, Jun. 1-12, 2020, online.

Huawei, Hisilicon, "[H352] Handling of integrity check failure in RRC for NR SL unicast", R2-2005463, 3GPP TSG-RAN WG2 Meeting #110 electronic, Jun. 1-12, 2020, online.

Qualcomm Incorporated, PC5 unicast link security establishment, 3GPP TSG-CT WG1 Meeting #123-e, C1-202875, Electronic meeting, Apr. 16-24, 2020.

Ericsson, Consideration on NR V2X sidelink PDCP protocol stack, 3GPP TSG-RAN WG2 #104, TDoc R2-1817959, Nov. 12-16, 2018, Spokane, WA, USA.

Huawei, Hisilicon, Considerations on RLM for NR V2X unicast, 3GPP TSG-RAN WG2 Meeting#107, R2-1907419, Aug. 26-30, 2019, Prague, Czech Republic.

LG Electronics Inc., Issues in Integrity Protection on DRB, 3GPP TSG-RAN2 Meeting #72, R2-106503, Nov. 15-Nov. 19, 2010, Jacksonville, USA.

CATT, Remaining Issues on NR SL RLM/RLF Procedure, 3GPP TSG RAN WG2#109-e, R2-2000209, Electronic meeting, Feb. 24-Mar. 6, 2020.

ZTE Corporation, Sanechips, UE behaviors upon PC5-RRC connection release and configuration failure, 3GPP TSG RAN WG2 Meeting #109 electronic, R2-2000261, Feb. 24-Mar. 6, 2020, Elbonia.

Intel Corporation, Support of PC5-S Keep alive signalling, 3GPP TSG-RAN WG2 Meeting#109 electronic, R2-2001099, Feb. 24-Mar. 6, 2020, Elbonia.

* cited by examiner

INTEGRITY PROTECTION FAILURE HANDLING METHOD AND APPARATUS, AND USER EQUIPMENT

CROSS-REFERENCE TO RELATED APPLICATIONS

This application is a continuation application of International Application No. PCT/CN2021/093828 filed on May 14, 2021, which claims priority to Chinese Patent Application No. 202010415321.3, filed in China on May 15, 2020, which are incorporated herein by reference in their entireties.

TECHNICAL FIELD

This application pertains to the field of communications technologies, and in particular, to an integrity protection failure handling method and apparatus, and user equipment.

BACKGROUND

New radio (NR) sidelink (SL, also referred to as sidelink, side link, or the like) transmission is mainly divided into transmission modes of broadcast, groupcast, and unicast. At present, sidelink radio resource control sidelink RRC signaling has been introduced into NR sidelink unicast communication, and a radio bearer for transmitting sidelink RRC signaling is referred to as a sidelink signaling bearer SL-SRB. For security of signaling transmission, integrity check needs to be performed for transmission on the sidelink signaling bearer. In the prior art, there is no handling method for sidelink signaling bearers in a case of an integrity check failure, leading to low security of sidelink communication.

SUMMARY

This application provides an integrity protection failure handling method and apparatus, and user equipment.

According to a first aspect, an embodiment of this application provides an integrity protection failure handling method, applied to first user equipment, where the first user equipment performs sidelink communication based on a destination address, and the integrity protection failure handling method includes:

performing a security control operation in at least a case that an integrity check failure indication for a sidelink signaling bearer is received.

According to a second aspect, an embodiment of this application provides an integrity protection failure handling apparatus, applied to first user equipment, where the first user equipment performs sidelink communication based on a destination address, and the apparatus includes:

a first execution module, configured to perform a security control operation in at least a case that an integrity check failure indication for a sidelink signaling bearer is received.

According to a third aspect, an embodiment of this application provides user equipment, including a processor, a memory, and a program or an instruction stored in the memory and capable of running on the processor, where when the program or the instruction is executed by the processor, the steps of the integrity protection failure handling method according to the first aspect are implemented.

According to a fourth aspect, an embodiment of this application provides a readable storage medium, where a program or an instruction is stored in the readable storage medium; and when the program or the instruction is executed by a processor, the steps of the integrity protection failure handling method according to the first aspect are implemented.

DESCRIPTION OF EMBODIMENTS

The following clearly and completely describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In the embodiments of this application, the terms "an example" or "for example" are used to represent an example, an illustration, or a description. Any embodiment or design scheme described as "an example" or "for example" in the embodiments of this application should not be construed as being more preferred or advantageous than other embodiments or design schemes. To be precise, the words such as "an example" or "for example" are intended to present a related concept in a specific manner.

In the specification and claims of this application, the terms such as "first" and "second" are intended to distinguish between similar objects but do not necessarily indicate a specific order or sequence. It should be understood that the numbers used in this way is interchangeable in appropriate circumstances so that the embodiments of this application described herein can be implemented in other orders than the order illustrated or described herein.

First, it should be stated that an integrity detection failure handling procedure on an NR Uu interface in the prior art is not applicable to integrity check failures of sidelink signaling bearers. For integrity detection failures on the Uu interface, security re-establishment can be implemented through reselection of an appropriate cell. However, a sidelink is established between a pair of specific user equipments (or a pair of specific destination addresses), and security re-establishment cannot be implemented using other UEs (or destination addresses).

The mechanism in the prior art cannot be applied to integrity check failure handling for sidelink signaling bearers, which also brings some difficulties to implementation of the embodiments of the present invention.

Figure 1:
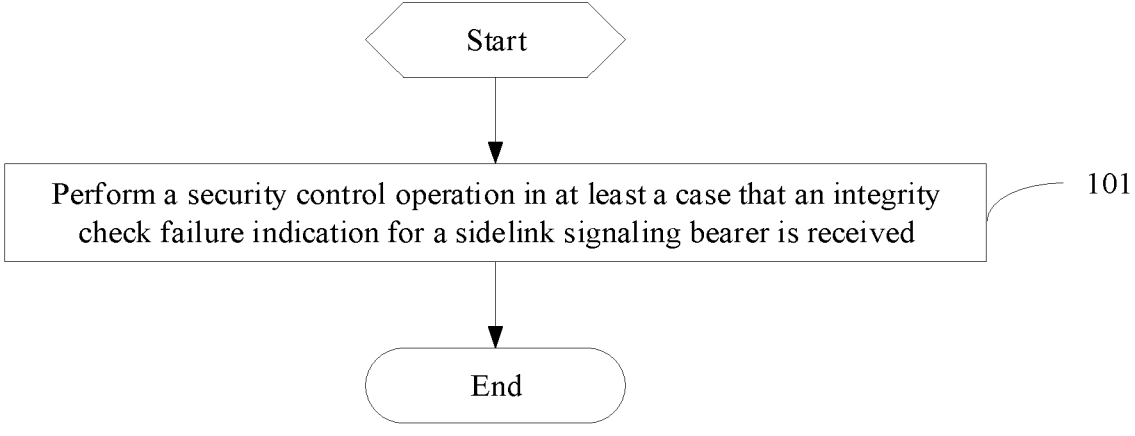
FIG. 1 is a flowchart of an integrity protection failure handling method according to an embodiment of this application.

FIG. 1 is a flowchart of an integrity protection failure handling method according to an embodiment of this application. As shown in FIG. 1, this embodiment of this application provides an integrity protection failure handling method, applied to first user equipment. The first user equipment performs sidelink communication based on a destination address, and the integrity protection failure handling method includes the following step.

Step 101: Perform a security control operation in at least a case that an integrity check failure indication for a sidelink signaling bearer is received.

Figure 2:
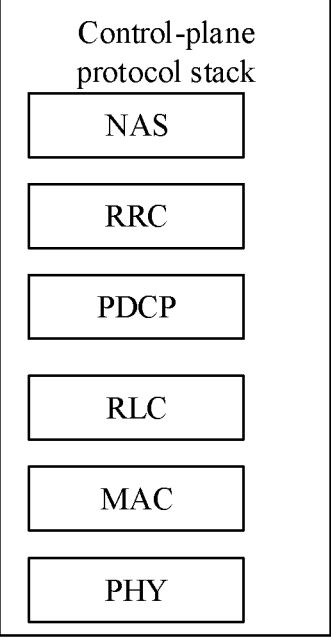
FIG. 2 is a schematic structural diagram of a control-plane protocol stack on a user equipment side.

As shown in FIG. 2, FIG. 2 is a schematic structural diagram of a control-plane protocol stack on a user equipment side. The control-plane protocol stack includes a physical layer (PHY), a medium access control (MAC) layer, a radio link control (RLC) layer, a packet data convergence protocol (PDCP) layer, a radio resource control (RRC) layer, and a non-access stratum (NAS). The PDCP protocol layer mainly aims to send or receive packet data to or from a peer PDCP entity, to mainly complete the following functions: IP packet header compression and decompression, data and signaling encryption, and signaling integrity protection.

The integrity protection function includes two processes of integrity protection and integrity check. An algorithm and a key for an integrity protection function of the PDCP entity are configured by a higher layer. Once a security function is activated, the integrity protection function is activated, and this function is applied to all PDCP protocol data units (PDU) indicated by the higher layer.

It can be found from the foregoing description that in a specific embodiment of the present invention, the integrity check failure indication may be sent by the PDCP entity, and the integrity protection failure handling method is performed by a radio resource control (RRC) entity.

It should be understood that, in this embodiment of this application, the integrity check failure indication is not limited to being obtained by means of sending by the PDCP entity, or may be obtained by other means, which is not limited herein. The first user equipment may perform a security control operation once occurrence of an integrity check failure for the sidelink signaling bearer can be determined, which can improve security of sidelink communication.

In other words, the integrity protection failure handling method in specific embodiments of the present invention is applied to the first user equipment, where the first user equipment performs sidelink communication based on the destination address. The integrity protection failure handling method includes:

performing a security control operation in a case that an integrity check failure event for the sidelink signaling bearer is detected.

However, the case that the integrity check failure indication for the sidelink signaling bearer is received from the PDCP entity can be considered that an integrity check failure event for the sidelink signaling bearer has been detected.

In a specific embodiment of the present invention, the first user equipment may be a mobile phone, a computer, invehicle user equipment, or the like. The destination address is an address for unicast communication with the first user equipment, and the destination address may correspond to the second user equipment. However, it should be understood that the first user equipment may establish a plurality of sidelink communications, that is, the first user equipment may have a plurality of destination addresses. The plurality of destination addresses may correspond to one destination user equipment, or may correspond to a plurality of destination user equipments. That is, the plurality of destination addresses all correspond to the second user equipment, or may respectively correspond to the second user equipment, third user equipment, and so on.

In this embodiment, the first user equipment performs a security control operation in at least the case that the integrity check failure indication for the sidelink signaling bearer is received. That is, performing the security control operation by the first user equipment in the case that the integrity check failure indication for the sidelink signaling bearer is received improves security of sidelink communication.

In a specific embodiment of the present invention, judging criteria for different integrity check failures can be configured by the higher layer or predefined by a protocol. For example, the following provides the judging criteria for different integrity check failures:

any one PDCP PDU of the sidelink signaling bearer encounters an integrity check failure;

a predetermined quantity of accumulated PDCP PDUs encounter an integrity check failure; and a predetermined quantity of consecutive PDCP PDUs encounter an integrity check failure.

Figures 3, 4:
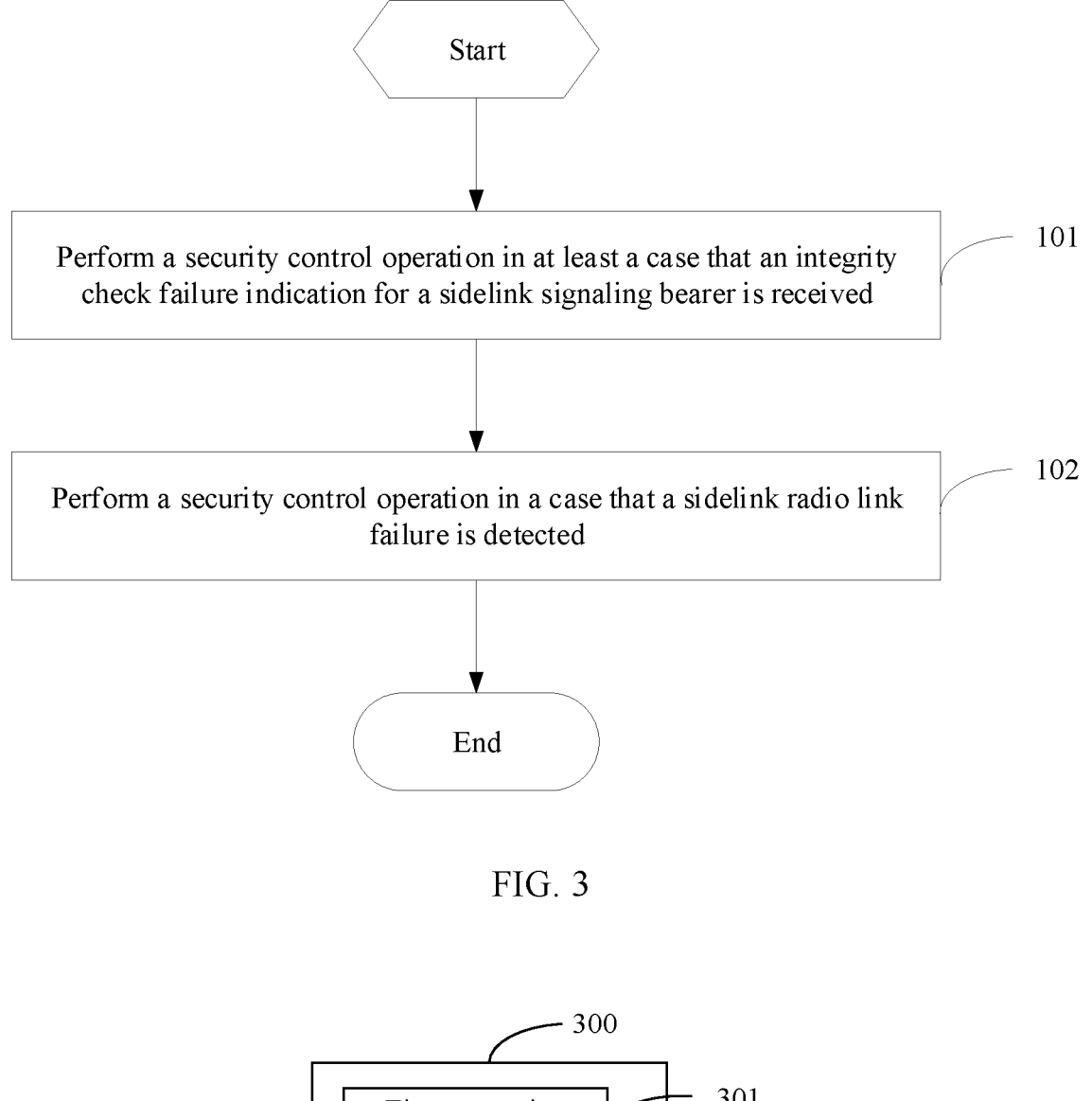
FIG. 3 is another flowchart of an integrity protection failure handling method according to an embodiment of this application.
FIG. 4 is a structural diagram of an integrity protection failure handling apparatus according to an embodiment of this application.

As shown in FIG. 3, in an embodiment of this application, the integrity protection failure handling method further includes the following step.

Step 102: Perform a security control operation in a case that a sidelink radio link failure is detected.

A sequence between step 101 and step 102 is not limited. The first user equipment may perform the security control operation in the case that the integrity check failure indication for the sidelink signaling bearer is received, and may also perform the security control operation in the case that the sidelink radio link failure is detected.

The method in the specific embodiment of the present invention can be applied to sidelink communication of various communication standards. In a case of being applied to sidelink communication of 5G NR, in an embodiment of this application, the sidelink signaling bearer is at least one of sidelink signaling bearer 1 (that is, SL-SRB1), sidelink signaling bearer 2 (that is, SL-SRB2), and sidelink signaling bearer 3 (that is, SL-SRB3). That is, in a case that an integrity check failure indication is received on at least one sidelink signaling bearer of SL-SRB1, SL-SRB2, and SL-SRB3, the security control operation is performed. SL-SRB1 is used to transmit PC5 Signaling (PC5-S) signaling that activates security, SL-SRB2 is used to transmit PC5-S signaling that requires security protection, and SL-SRB3 is used to transmit PC5 RRC signaling that requires security protection. Security protection herein refers to encryption and integrity protection requirements.

In other words, the specific embodiment of the present invention may be applied to part of sidelink signaling bearers, or may be applied to all sidelink signaling bearers.

Configuring the integrity protection function is intended to improve security of communication, for example, preventing data from being tampered with. When an integrity check failure occurs, it indicates that the sidelink communication no longer meets security requirements, and then the security control operation can be performed in this case.

In the specific embodiment of the present invention, the security control operation may use one of the following three types of operations.

The first type is releasing a related bearer or connection for sidelink communication, so that a transmission tunnel for sidelink communication no longer exists, thereby avoiding proceeding with sidelink communication.

For example, releasing a related bearer or connection for sidelink communication may be at least one of the following operations:

releasing a data bearer corresponding to sidelink communication performed by the first user equipment based on the destination address;

releasing a signaling bearer corresponding to sidelink communication performed by the first user equipment based on the destination address; and releasing a PC5 interface RRC connection corresponding to sidelink communication performed by the first user equipment based on the destination address, where a sidelink interface is also referred to as a PC5 interface.

The second type is discarding related configuration information of the sidelink signaling bearer, so that sidelink communication cannot be initiated.

For example, discarding related configuration information of the sidelink signaling bearer may be at least one of the following operations:

discarding configuration information corresponding to sidelink communication performed by the first user equipment based on the destination address; where the configuration information may be configuration information from RRC signaling, PC5 RRC signaling, or pre-configuration signaling; and discarding a security key corresponding to sidelink communication performed by the first user equipment based on the destination address; where the security key includes KNRP, KNRP-sess, NRPEK, NRPIK, and the like; $K_{NRP}$ is a root key shared between two user equipments in sidelink communication, and needs to be exchanged through the PC5 interface; a root key $K_{NRP}$-sess used in actual security context may be derived from $K_{NRP}$, and then an encryption key NRPEK used by an encryption algorithm and an integrity key NRPIK used by an integrity algorithm are further derived from $K_{NRP}$-sess. The third type is stopping sidelink communication by stopping a timer, for example:

stopping a timer corresponding to sidelink communication performed by the first user equipment based on the destination address, or stopping all timers for sidelink communication performed by the first user equipment.

The timer may be included in the configuration information.

That is, the security control operation specifically includes at least one of the following operations:

releasing a data bearer corresponding to sidelink communication performed by the first user equipment based on the destination address;

releasing a signaling bearer corresponding to sidelink communication performed by the first user equipment based on the destination address;

releasing a sidelink interface radio resource control PC5 RRC connection corresponding to sidelink communication performed by the first user equipment based on the destination address;

discarding configuration information corresponding to sidelink communication performed by the first user equipment based on the destination address;

discarding a security key corresponding to sidelink communication performed by the first user equipment based on the destination address; and stopping a timer corresponding to sidelink communication performed by the first user equipment based on the destination address, or stopping all timers for sidelink communication performed by the first user equipment.

For example, all timers related to sidelink communication are stopped, or a timer related to sidelink communication with the destination address is stopped. Further, the timer includes at least T400, and T400 is used for a sidelink RRC reconfiguration procedure and is started at a moment when sidelink UE sends a sidelink RRC reconfiguration message.

In an embodiment of this application, in step 101, in the case that the integrity check failure indication for the sidelink signaling bearer is received, after the performing a security control operation, the method further includes:

sending an RRC message to a network-side device, where the RRC message is used to report that sidelink communication with the destination address by the first user equipment fails.

The RRC message sent to the network-side device may use an existing sidelink user equipment information SidelinkUEInformation message. The first user equipment sends the RRC message to the network-side device to report that sidelink communication with the destination address by the first user equipment fails.

After receiving the message, the network-side device may release related resources allocated to the first user equipment for sidelink communication based on the destination address, thereby reducing resource waste.

Further, the RRC message is also used to indicate that a cause of the sidelink communication failure is integrity check failure, so as to notify the network-side device about the cause of the sidelink communication failure. In this way, the network-side device is able to perform more targeted handling based on the cause of the sidelink communication failure, improving accuracy of handling.

In an embodiment of this application, in the case that the integrity check failure indication for the sidelink signaling bearer is received, after the performing a security control operation, the method further includes:

sending indication information to an upper-layer entity of the first user equipment, where the indication information is used to notify that a PC5 RRC connection has been released.

In a specific embodiment of the present invention, the upper-layer entity may be an entity above an access stratum (AS), for example, a V2X layer and an application layer.

After the first user equipment performs the security control operation, the indication information is sent to the upper-layer entity of the first user equipment, so that the upper-layer entity stops sidelink communication based on the destination address, preventing the upper-layer entity from continuing to process and/or send data that needs to be transmitted through sidelink.

Further, the indication information is further used to notify that a cause of the PC5 RRC connection being released is integrity check failure or failure of the PC5 RRC connection.

In an embodiment of this application, the integrity protection failure handling method further includes:

sending a PC5 RRC message to second user equipment corresponding to the destination address, where the PC5 RRC message is used to indicate the second user equipment to stop sidelink communication performed based on the destination address.

The step in this embodiment may be performed before the first user equipment performs the security control operation, or may be performed after the first user equipment performs the security control operation, and an execution sequence of this step depends on specific content of the security control operation. When the action of sending the PC5 RRC message is performed before the security control operation, it is not affected by the specific content of the security control operation. However, when the action of sending the PC5 RRC message is performed after the first user equipment performs the security control operation, the security control operation performed by the first user equipment does not include releasing the signaling bearer, that is, the performing the at least one security control operation by the first user equipment does not include releasing the signaling bearer that is corresponding to the sidelink communication performed by the first user equipment based on the destination address. The PC5 RRC message can be transmitted using the reserved signaling bearer in this case because the signaling bearer has not been released.

The operation of stopping sidelink communication based on the destination address by the second user equipment may include: releasing a corresponding data bearer (which is releasing the related bearer or connection for sidelink communication as described above), releasing corresponding configuration information (which is discarding the related configuration information for the sidelink signaling bearer as described above), and the like.

The first user equipment sends the PC5 RRC message to the second user equipment, so that the second user equipment does not need to monitor and receive data based on the destination address any longer.

Further, the PC5 RRC message carries a sidelink configuration reset indication. The PC5 RRC message may be a PC5 RRC dedicated message, for example, being an sl-ResetConfig-r16 message (R16 sidelink configuration reset message). The sl-ResetConfig-r16 message is used to notify the second user equipment that both the data bearer and configuration corresponding to sidelink communication performed based on the destination address are released, so that the second user equipment does not need to monitor and receive data based on the destination address any longer, which can reduce power consumption of the user equipment and resources of the processor.

Referring to FIG. 4, FIG. 4 is a structural diagram of an integrity protection failure handling apparatus according to an embodiment of this application. The apparatus is applied to first user equipment, and the first user equipment performs sidelink communication based on a destination address. As shown in FIG. 4, the integrity protection failure handling apparatus 300 includes:

a first execution module 301, configured to perform a security control operation in at least a case that an integrity check failure indication for a sidelink signaling bearer is received.

In an embodiment of this application, the integrity check failure indication is sent by a packet data convergence protocol PDCP entity.

In an embodiment of this application, the integrity protection failure handling apparatus 300 further includes:

a second execution module, configured to perform a security control operation in a case that a sidelink radio link failure is detected.

In an embodiment of this application, the sidelink signaling bearer is at least one of sidelink signaling bearer 1, sidelink signaling bearer 2, and sidelink signaling bearer 3.

In an embodiment of this application, the security control operation specifically includes at least one of the following operations:

releasing a data bearer corresponding to sidelink communication performed by the first user equipment based on the destination address;

releasing a signaling bearer corresponding to sidelink communication performed by the first user equipment based on the destination address;

releasing a sidelink interface radio resource control PC5 RRC connection corresponding to sidelink communication performed by the first user equipment based on the destination address;

discarding configuration information corresponding to sidelink communication performed by the first user equipment based on the destination address;

discarding a security key corresponding to sidelink communication performed by the first user equipment based on the destination address; and stopping a timer corresponding to sidelink communication performed by the first user equipment based on the destination address, or stopping all timers for sidelink communication performed by the first user equipment.

In an embodiment of this application, the integrity protection failure handling apparatus 300 further includes:

a first sending module, configured to send an RRC message to a network-side device, where the RRC message is used to report that sidelink communication with the destination address by the first user equipment fails.

In an embodiment of this application, the RRC message is further used to indicate that a cause of the sidelink communication failure is integrity check failure.

In an embodiment of this application, the apparatus further includes:

a second sending module, configured to send indication information to an upper-layer entity of the first user equipment, where the indication information is used to notify that a PC5 RRC connection has been released.

In an embodiment of this application, the indication information is further used to notify that a cause of the PC5 RRC connection being released is integrity check failure or failure of the PC5 RRC connection.

In an embodiment of this application, the integrity protection failure handling apparatus 300 further includes:

a third sending module, configured to send a PC5 RRC message to second user equipment corresponding to the destination address, where the PC5 RRC message is used to indicate the second user equipment to stop sidelink communication performed based on the destination address.

In an embodiment of this application, the PC5 RRC message carries a sidelink configuration reset indication.

The integrity protection failure handling apparatus 300 provided in this embodiment of this application is capable of implementing the processes of the method embodiments of FIG. 1 and FIG. 3. To avoid repetition, details are not described herein again. In this embodiment, the first user equipment performs a security control operation in at least the case that the integrity check failure indication for the sidelink signaling bearer is received. That is, performing the security control operation by the first user equipment in the case that the integrity check failure indication for the sidelink signaling bearer is received improves security of sidelink communication.

It should be noted that the integrity protection failure handling apparatus in this embodiment of this application may be an apparatus, or may be a component, an integrated circuit, or a chip in user equipment.

Figure 5:
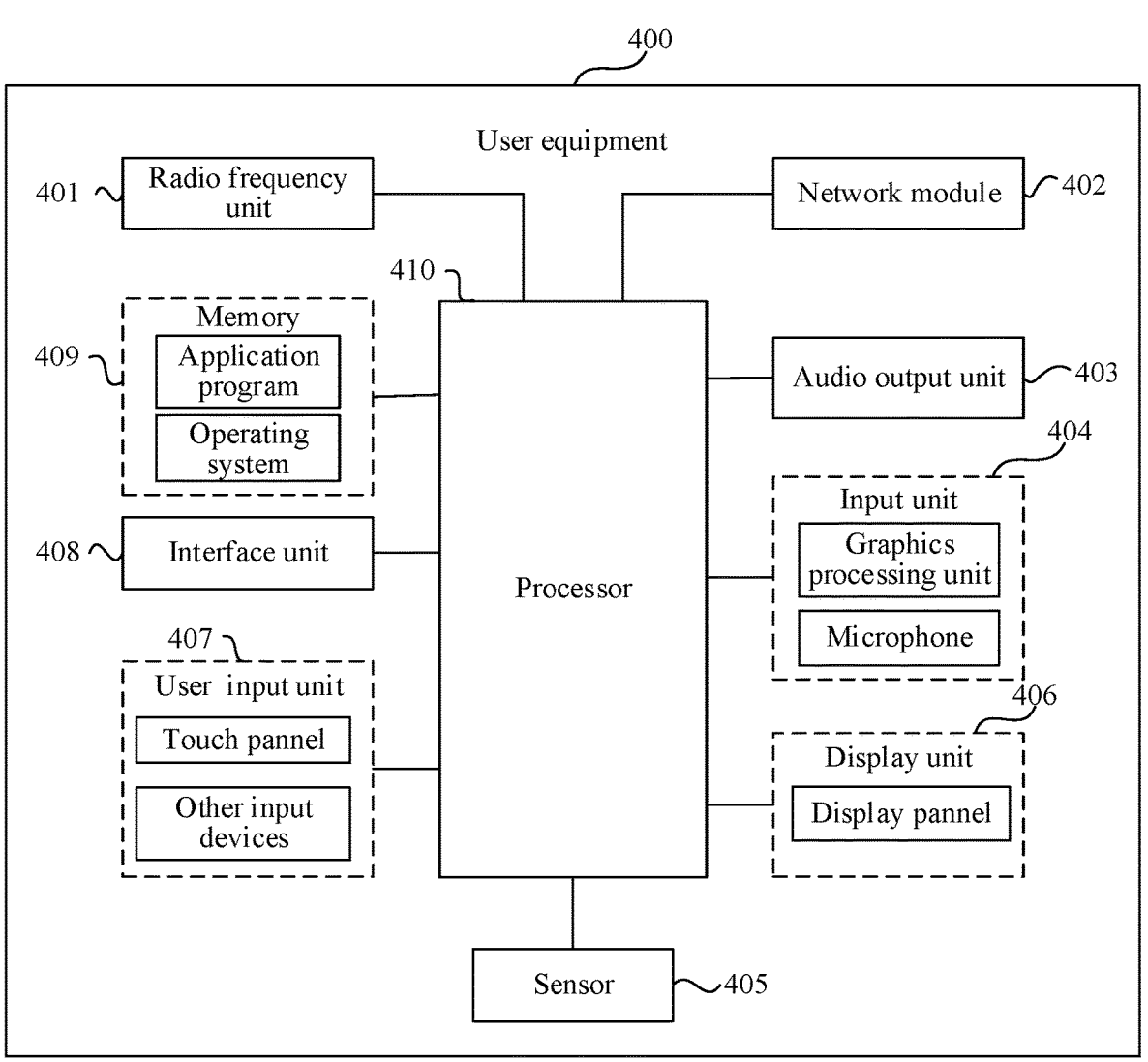
FIG. 5 is a structural diagram of user equipment according to an embodiment of this application.

FIG. 5 is a schematic diagram of a hardware structure of user equipment for implementing the embodiments of this application.

The user equipment 400 includes but is not limited to components such as a radio frequency unit 401, a network module 402, an audio output unit 403, an input unit 404, a sensor 405, a display unit 406, a user input unit 407, an interface unit 408, a memory 409, and a processor 410.

A person skilled in the art can understand that the user equipment 400 may further include a power supply (for example, a battery) supplying power to the components, and the power supply may be logically connected to the processor 410 through a power management system. In this way, functions such as charge management, discharge management, and power consumption management are implemented by using the power management system. The structure of the user equipment shown in FIG. 5 does not constitute any limitation on the user equipment. The user equipment may include more or fewer components than those shown in FIG. 11, or a combination of some components, or the components disposed differently. Details are not repeated herein.

The processor 410 is configured to perform a security control operation in at least a case that an integrity check failure indication for a sidelink signaling bearer is received.

Further, the integrity check failure indication is sent by a packet data convergence protocol PDCP entity.

Further, the processor 410 is further configured to perform a security control operation in a case that a sidelink radio link failure is detected.

Further, the sidelink signaling bearer is at least one of sidelink signaling bearer 1, sidelink signaling bearer 2, and sidelink signaling bearer 3.

Further, the security control operation specifically includes at least one of the following operations:

releasing a data bearer corresponding to sidelink communication performed by the first user equipment based on the destination address;

releasing a signaling bearer corresponding to sidelink communication performed by the first user equipment based on the destination address;

releasing a sidelink interface radio resource control PC5 RRC connection corresponding to sidelink communication performed by the first user equipment based on the destination address;

discarding configuration information corresponding to sidelink communication performed by the first user equipment based on the destination address;

discarding a security key corresponding to sidelink communication performed by the first user equipment based on the destination address; and stopping a timer corresponding to sidelink communication performed by the first user equipment based on the destination address, or stopping all timers for sidelink communication performed by the first user equipment.

Further, the radio frequency unit 401 is configured to send an RRC message to a network-side device, where the RRC message is used to report that sidelink communication with the destination address by the first user equipment fails.

Further, the RRC message is further used to indicate that a cause of the sidelink communication failure is integrity check failure.

Further, the radio frequency unit 401 is configured to send indication information to an upper-layer entity of the first user equipment, where the indication information is used to notify that a PC5 RRC connection has been released.

Further, the indication information is further used to notify that a cause of the PC5 RRC connection being released is integrity check failure or failure of the PC5 RRC connection.

Further, the radio frequency unit 401 is configured to send a PC5 RRC message to second user equipment corresponding to the destination address, where the PC5 RRC message is used to indicate the second user equipment to stop sidelink communication performed based on the destination address.

Further, the PC5 RRC message carries a sidelink configuration reset indication.

Optionally, an embodiment of this application further provides user equipment, including a processor 410, a memory 409, and a program or an instruction stored in the memory 409 and capable of running on the processor 410. When the program or the instruction is executed by the processor 410, the processes of the embodiment of the foregoing integrity protection failure handling method can be implemented, with same technical effects achieved. To avoid repetition, details are not described herein again.

An embodiment of this application further provides a chip, where the chip includes a processor and a communications interface. The communications interface is coupled to the processor, and the processor is configured to run a program or an instruction to implement the processes of the foregoing integrity protection failure handling method embodiments, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An integrity protection failure handling method, applied to first user equipment, wherein the first user equipment performs side link communication based on a destination address, and the integrity protection failure handling method comprises:

performing a security control operation in at least a case that an integrity check failure indication for a sidelink signaling bearer is received;

wherein the integrity check failure indication is sent by a packet data convergence protocol (PDCP) entity;

wherein the sidelink signaling bearer is at least one of sidelink signaling bearer 2, and sidelink signaling bearer 3;

wherein the sidelink signaling bearer 2 is sidelink signalling radio bearer 2 (SL-SRB 2), the sidelink signaling bearer 3 is sidelink signalling radio bearer 3 (SL-SRB 3);

wherein the security control operation specifically comprises at least one of the following operations:

releasing a data bearer corresponding to the sidelink communication performed by the first user equipment based on the destination address;

releasing a signaling bearer corresponding to the sidelink communication performed by the first user equipment based on the destination address;

releasing a sidelink interface radio resource control (PC5 RRC) connection corresponding to the sidelink communication performed by the first user equipment based on the destination address; and discarding configuration information corresponding to the sidelink communication performed by the first user equipment based on the destination address.

2. The integrity protection failure handling method according to claim 1, further comprising:

performing the security control operation in a case that a sidelink radio link failure is detected.

3. The integrity protection failure handling method according to claim 1, wherein the security control operation specifically further comprises at least one of the following operations:

discarding a security key corresponding to the sidelink communication performed by the first user equipment based on the destination address; and stopping a timer corresponding to the sidelink communication performed by the first user equipment based on the destination address, or stopping all timers for the sidelink communication performed by the first user equipment.

4. The integrity protection failure handling method according to claim 1, in the case that the integrity check failure indication for the sidelink signaling bearer is received, after the performing the security control operation, further comprising:

sending an radio resource control (RRC) message to a network-side device, wherein the RRC message is used to report that the sidelink communication with the destination address by the first user equipment fails.

5. The integrity protection failure handling method according to claim 4, wherein the RRC message is further used to indicate that a cause of sidelink communication failure is integrity check failure.

6. The integrity protection failure handling method according to claim 1, in the case that the integrity check failure indication for the sidelink signaling bearer is received, after the performing a security control operation, further comprising:

sending indication information to an upper-layer entity of the first user equipment, wherein the indication information is used to notify that a PC5 RRC connection has been released.

7. The integrity protection failure handling method according to claim 6, wherein the indication information is further used to notify that a cause of the PC5 RRC connection being released is integrity check failure or failure of the PC5 RRC connection.

8. The integrity protection failure handling method according to claim 1, further comprising:

sending a PC5 RRC message to second user equipment corresponding to the destination address, wherein the PC5 RRC message is used to indicate the second user equipment to stop the sidelink communication performed based on the destination address;

wherein the PC5 RRC message carries a sidelink configuration reset indication.

9. A User equipment, wherein the user equipment performs sidelink communication based on a destination address, the user equipment comprising a processor, a memory, and a program or an instruction stored in the memory, wherein when the program or the instruction is executed by the processor, the user equipment implements:

performing a security control operation in at least a case that an integrity check failure indication for a sidelink signaling bearer is received;

wherein the integrity check failure indication is sent by a packet data convergence protocol (PDCP) entity;

wherein the sidelink signaling bearer is at least one of sidelink signaling bearer 2, and sidelink signaling bearer 3;

wherein the sidelink signaling bearer 2 is sidelink signalling radio bearer 2 (SL-SRB 2), the sidelink signaling bearer 3 is sidelink signalling radio bearer 3 (SL-SRB 3);

wherein the security control operation specifically comprises at least one of the following operations:

releasing a data bearer corresponding to the sidelink communication performed by the first user equipment based on the destination address;

releasing a signaling bearer corresponding to the sidelink communication performed by the first user equipment based on the destination address;

releasing a sidelink interface radio resource control (PC5 RRC) connection corresponding to the sidelink communication performed by the first user equipment based on the destination address; and discarding configuration information corresponding to the sidelink communication performed by the first user equipment based on the destination address.

10. The user equipment according to claim 9, wherein when the program or the instruction is executed by the processor, the user equipment further implements:

performing the security control operation in a case that a sidelink radio link failure is detected.

11. The user equipment according to claim 9, wherein the security control operation specifically further comprises at least one of the following operations:

discarding a security key corresponding to the sidelink communication performed by the first user equipment based on the destination address; and stopping a timer corresponding to the sidelink communication performed by the first user equipment based on the destination address, or stopping all timers for the sidelink communication performed by the first user equipment.

12. The user equipment according to claim 9, in the case that the integrity check failure indication for the sidelink signaling bearer is received, after the performing the security control operation, the user equipment further implements:

sending an radio resource control (RRC) message to a network-side device, wherein the RRC message is used to report that the sidelink communication with the destination address by the first user equipment fails.

13. The user equipment according to claim 12, wherein the RRC message is further used to indicate that a cause of sidelink communication failure is integrity check failure.

14. The user equipment according to claim 9, in the case that the integrity check failure indication for the sidelink signaling bearer is received, after the performing a security control operation, the user equipment further implements:

sending indication information to an upper-layer entity of the first user equipment, wherein the indication information is used to notify that a PC5 RRC connection has been released.

15. The user equipment according to claim 14, wherein the indication information is further used to notify that a cause of the PC5 RRC connection being released is integrity check failure or failure of the PC5 RRC connection.

16. The user equipment according to claim 9, wherein when the program or the instruction is executed by the processor, the user equipment further implements:

sending a PC5 RRC message to second user equipment corresponding to the destination address, wherein the PC5 RRC message is used to indicate the second user equipment to stop the sidelink communication performed based on the destination address;

wherein the PC5 RRC message carries a sidelink configuration reset indication.

\* \* \* \* \*